US011363192B2

(12) United States Patent
Xie et al.

(10) Patent No.: US 11,363,192 B2
(45) Date of Patent: Jun. 14, 2022

(54) METHOD, AND APPARATUS FOR CLOCK SYNCHRONIZATION, DEVICE, STORAGE MEDIUM AND VEHICLE (71) Applicant: BAIDU ONLINE NETWORK TECHNOLOGY (BEIJING) CO., LTD., Beijing (CN)

(72) Inventors: Yuanfan Xie, Beijing (CN); Xun Zhou, Beijing (CN); Shirui Li, Beijing (CN); Liang Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 369 days.

(21) Appl. No.: 16/561,617

(22) Filed: Sep. 5, 2019

(65) Prior Publication Data
US 2020/0084372 A1  Mar. 12, 2020

(30) Foreign Application Priority Data

Sep. 7, 2018  (CN) .......................... 201811044823.9

(51) Int. Cl.
G06T 7/70         (2017.01)
H04N 5/232       (2006.01)
G06T 7/80         (2017.01)

(52) U.S. Cl.
CPC .......... H04N 5/23227 (2018.08); G06T 7/70 (2017.01); G06T 7/80 (2017.01)

(58) Field of Classification Search
CPC ...... H04N 5/04; H04N 7/181; H04N 5/23227; H04N 5/247; G06T 7/70; G06T 7/80
See application file for complete search history.

(56) References Cited

U.S. PATENT DOCUMENTS

2014/0133730 A1    5/2014  Tseng et al.
2016/0134863 A1*   5/2016  Horesh ................. G06F 3/0304
                                                                348/78
(Continued)

FOREIGN PATENT DOCUMENTS

CN    104112363 A    10/2014
CN    107688174 A     2/2018
(Continued)

OTHER PUBLICATIONS

Chinese Patent Application No. 201811044823.9, First Office Action dated May 27, 2020, 5 pages.
(Continued)

Primary Examiner — Syed Haider
(74) Attorney, Agent, or Firm — Lathrop GPM LLP (57) ABSTRACT Embodiments of the present disclosure provide a method and an apparatus for clock synchronization, a device, a storage medium and a vehicle. The method includes: determining a first pose change of an image acquirer with respect to a reference coordinate system at different image acquisition time points; determining a second pose change of a calibration acquirer with respect to the reference coordinate system at different corrected image acquisition time points, in which, the different corrected image acquisition correction time points are determined according to the different image acquisition time points and each predetermined correction time variable; and performing a clock synchronization on the image acquirer and the calibration acquirer according to the first pose change of the image acquirer and the second pose change of the calibration acquirer corresponding to the each correction time variable.

13 Claims, 3 Drawing Sheets (56) References Cited

U.S. PATENT DOCUMENTS

2017/0139411 A1*  5/2017  Hartung ............... G05D 1/0077
2018/0204338 A1   7/2018  Narang et al.
2020/0082571 A1*  3/2020  Xie ........................ G06T 7/80

FOREIGN PATENT DOCUMENTS

| CN | 108226906 A | 6/2018 |
| CN | 108447097 A | 8/2018 |
| JP | 2017119102 A | 7/2017 |
| JP | 2017224984 A | 12/2017 |

OTHER PUBLICATIONS

Chinese Patent Application No. 201811044823.9, English translation of First Office Action dated May 27, 2020, 7 pages.
Huang, A.S., Lane Estimation for Autonomous Vehicles using Vision and LIDAR, PhD Thesis, Feb. 1, 2010, 114 pages.
European Patent Application No. 19195624.2, extended Search and Opinion dated Feb. 11, 2020, 7 pages.
Japanese Patent Application No. 2019-160980, Office Action dated Nov. 24, 2020, 3 pages.
Japanese Patent Application No. 2019-160980, English translations of Office Action dated Nov. 24, 2020, 3 pages.

* cited by examiner

METHOD, AND APPARATUS FOR CLOCK SYNCHRONIZATION, DEVICE, STORAGE MEDIUM AND VEHICLE

CROSS REFERENCE TO RELATED APPLICATIONS

This application is based on and claims priority to Chinese patent application Serial No. 201811044823.9, filed on Sep. 7, 2018, the entire contents of which are incorporated herein by reference.

FIELD

The present disclosure relates to a field of clock synchronization technology, and more particularly, to a method and an apparatus for clock synchronization, a device, a storage medium and a vehicle.

BACKGROUND

With the continuous development of technology, an automatic driving technology is gradually favored by people, which may free a driver from some driving-related operations. During an automatic driving, a plurality of acquirers need to be installed on an automatic driving system, information about a vehicle driving environment and a traffic condition within a certain field of vision is acquired with the plurality of acquirers, and then a safety automatic driving may be performed according to the information obtained. In the above process, it is important for the automatic driving technology to ensure that the plurality of acquirers can simultaneously acquire the information about the vehicle driving environment and the traffic condition.

SUMMARY

A first aspect of embodiments of the present disclosure provides a method for clock synchronization. The method includes: determining a first pose change of an image acquirer with respect to a reference coordinate system at different image acquisition time points; determining a second pose change of a calibration acquirer with respect to the reference coordinate system at different corrected image acquisition time points, wherein, the different corrected image acquisition time points are determined according to the different image acquisition time points and each predetermined correction time variable; and performing a clock synchronization on the image acquirer and the calibration acquirer according to the first pose change of the image acquirer and the second pose change of the calibration acquirer corresponding to each correction time variable.

A second aspect of embodiments of the present disclosure provides an apparatus for clock synchronization. The apparatus includes a processor and a memory configured to store software modules executable by the processor. The processor is configured to run a program corresponding to the software modules by reading the software modules stored in the memory. The software modules include: a first pose determining module, configured to determine a first pose change of an image acquirer with respect to a reference coordinate system at different image acquisition time points; a second pose determining module, configured to determine a second pose change of a calibration acquirer with respect to the reference coordinate system at different corrected image acquisition time points, wherein the different corrected image acquisition time points are determined according to the different image acquisition time points and each predetermined correction time variable; and a clock synchronization performing module, configured to perform a clock synchronization on the image acquirer and the calibration acquirer according to the first pose change of the image acquirer and the second pose change of the calibration acquirer corresponding to each correction time variable.

A third aspect of embodiments of the present disclosure provides a device. The device includes: one or more processors; and a memory configured to store one or more programs, in which, when the one or more programs are executed by the one or more processors, the one or more processors are caused to perform the method for clock synchronization according to any one of embodiments of the present disclosure.

A fourth aspect of embodiments of the present disclosure provides a computer readable storage medium, stored thereon with computer programs that, when executed by a processor, perform the method for clock synchronization according to any one of embodiments of the present disclosure.

A fifth aspect of embodiments of the present disclosure provides a vehicle. The vehicle includes: a vehicle body, an image acquirer provided on the vehicle body; a calibration acquirer provided on the body; and a computer device in a communication connection with the image acquirer and the calibration acquirer respectively, and configured to perform clock synchronization on the image acquirer and the calibration acquirer according to the method provided in any of embodiments of the present disclosure.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

In the related art, in an automatic driving system with the plurality of acquirers installed, an externally triggered acquirer may receive an external control signal through an interface, and according to the external control signal, a plurality of externally triggered acquirers are controlled to collect simultaneously, for example, the plurality of externally triggered acquirers are controlled to simultaneously expose and collect. However, because of a high cost of the externally triggered acquirer and a need for internal wiring, and in view of an acquirer without external trigger do not need to be triggered and have lower requirements on a system, in actual use, the acquirer without external trigger is usually selected instead of the externally triggered acquirer. However, it is necessary to synchronize a plurality of acquirers without external trigger.

Embodiment 1

Figure 1:
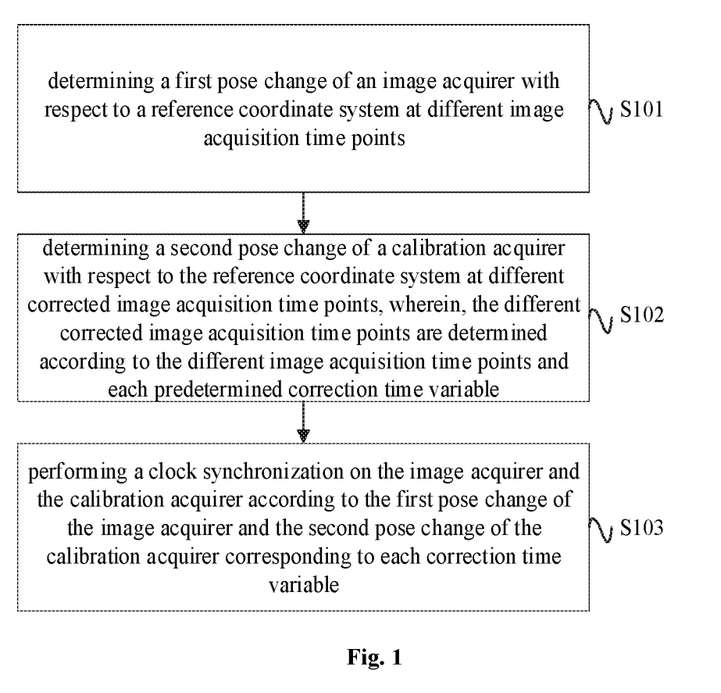
FIG. 1 is a flow chart of a method for clock synchronization according to Embodiment 1 of the present disclosure.

FIG. 1 is a flow chart of a method for clock synchronization according to Embodiment 1 of the present disclosure. The embodiment may be applied to realize a synchronous acquisition of a plurality of acquirers, for example, to realize synchronous exposure and acquisition of a plurality of cameras in an automatic driving system. The method may be executed by an apparatus for clock synchronization, and the apparatus may be implemented in software and/or hardware and may be integrated on any device with network communication function.

As illustrated in FIG. 1, the method for clock synchronization in this embodiment may include the following.

At block S101, a first pose change of an image acquirer with respect to a reference coordinate system at different image acquisition time points is determined.

In embodiments of the present disclosure, the image acquirer may acquire images at the different image acquisition time points to obtain different images acquired by the image acquirer at the different image acquisition time points. In order to quantitatively describe a change between poses of the image acquirer at the different image acquisition time points, a reference coordinate system may be selected. For example, a coordinate system of the image acquirer at any time may be selected as the reference coordinate system. The pose change of the image acquirer at the different image acquisition time points may be quantitatively described by using the reference coordinate system. T pose may include a position and an attitude. The position may be represented by a translation matrix T, and the attitude may be represented by a rotation matrix R. The pose may involve six degrees of freedom, and its parameters may be expressed as X, Y, Z, $\alpha$, $\beta$ and $\gamma$.

In embodiments of the present disclosure, the first pose change may refer to a change between poses of the image acquirer with respect to the reference coordinate system at the different image acquisition time points. For example, taking two images acquired by the image acquirer as an example, the two images may be defined as a first image and a second image. The first image and the second image correspond to different image acquisition time points respectively. The first pose change may be understood as the change between the pose of the image acquirer with respect to the reference coordinate system at the time point when the image acquirer acquires the first image and the pose of the image acquirer with respect to the reference coordinate system at the time point when the image acquirer acquires the second image. It should be noted that, since the images acquired by the image acquirer at the different image acquisition time points include but are not limited to the above first image and second image, the first pose change of the image acquirer with respect to the reference coordinate system at the different image acquisition time points may not only include the pose change of the image acquirer with respect to the reference coordinate system at the time points when the image acquirer acquires the first image and the second image, but may also include the pose change of the image acquirer with respect to the reference coordinate system at the time points when acquiring other different images.

In embodiments of the present disclosure, in a 2D-2D camera pose estimation principle, the pose change of the image acquirer with respect to the reference coordinate system at the time points when acquiring two images may be obtained according to the two images acquired by the image acquirer and a corresponding relationship of feature points between the two image acquired. The specific process may be: extracting at least one feature point from each image acquired by the image acquirer; and obtaining the pose change the image acquirer with respect to the reference coordinate system at the time points when acquiring the two images according to a matching result of the feature points of the two images. It will be understood that, the two images are not randomly selected. The feature points of the two images need to be matched with each other, and after obtaining the corresponding relationship of feature points between two images, the pose change of the image acquirer with respect to the reference coordinate system at the time points when acquiring two different images may be obtained. Therefore, in embodiments, when determining the first pose change of the image acquirer with respect to the reference coordinate system at the different image acquisition time points, the corresponding relationship of the feature points should exist between the different images acquired by the image acquirer at the different image acquisition time points. Based on the 2D-2D camera pose estimation principle and according to the different images acquired by the image acquirer at the different image acquisition time points, the first pose change of the image acquirer with respect to the reference coordinate system at the different image acquisition time points may be determined, and the different image acquisition time points when the image acquirer acquires the different images may be determined respectively.

Exemplarily, taking the two images acquired by the image acquirer as an example, the two images may be defined as the first image and the second image. Based on the 2D-2D camera pose estimation principle and according to the first image and the second image acquired by the image acquirer, the pose change of the image acquirer with respect to the reference coordinate system at the time point when the image acquirer acquires the first image and at the time point when the image acquirer acquires the second image is determined. Specifically, based on the 2D-2D camera pose estimation principle, the feature points of the two images may be matched with each other to obtain the corresponding relationship of the feature points between the two images, and the pose change of the image acquirer with respect to the reference coordinate system at the time point when the image acquirer acquires the first image and at the time point when the image acquirer acquires the second image is determined according to the corresponding relationship of the feature points between the two images. The different image acquisition time points of the image acquirer include but are not limited to the image acquisition time point of acquiring the first image and the image acquisition time point of acquiring the second image, and may also include the image acquisition time points of acquiring other images. Thus, when determining the first pose change of the image acquirer with respect to the reference coordinate system at the different image acquisition time points, reference may be made to the above operations of determining the pose change of the image acquirer with respect to the reference coordinate system at the time point when the image acquirer acquires the first image and at the time point when the image acquirer acquires the second image, such that the first pose change of the image acquirer with respect to the reference coordinate system at the different image acquisition time points may be obtained.

At block S102, a second pose change of a calibration acquirer with respect to the reference coordinate system at different acquisition correction time points of image is determined; in which, the different acquisition correction time points of image are determined according to the different image acquisition time points and each predetermined correction time variable.

In embodiments of the present disclosure, acquisition time points of the image acquirer may be the acquisition time points calibrated with respect to a clock of the image acquirer, and the acquisition time points of the calibration acquirer may be the acquisition time points calibrated with respect to the clock of the calibration acquirer. Specifically, both the image acquirer and calibration acquirer may be controlled to perform acquisition by their own clock signal and they may perform the acquisition synchronously. That is, an ideal acquisition time point of the image acquirer is the same as that of the calibration acquirer. When the clock of the image acquirer is synchronized with the clock of the calibration acquirer, an actual acquisition time point of the image acquirer is the same as that of the calibration acquirer; when the clock of the image acquirer is not synchronized with the clock of the calibration acquirer, the actual acquisition time point of the image acquirer is not the same as that of the calibration acquirer.

Exemplarily, take both the image acquirer and calibration acquirer performing acquisition at a certain time point A according to a clock control instruction as an example. The image acquirer acquires corresponding images at the acquisition time point A calibrated by its own clock, and the calibration acquirer also acquires data required by the calibration acquirer at the acquisition time point A calibrated by its own clock. It should be noted that, the acquisition time point A is determined with respect to the clock of the image acquirer and with respect to the clock of calibration acquirer respectively. When the clock of the image acquirer is not synchronized with the clock of the calibration acquirer, the acquisition time point A of the image acquirer is not consistent with the acquisition time point A of the calibration acquirer under a standard clock. For example, in an actual acquisition process, when the acquisition time point A corresponding to the clock of the image acquirer has arrived, the acquisition time point A corresponding to the clock of the calibration acquirer has not yet arrived, and the calibration acquirer may still be at an acquisition time point B, in which the acquisition time point B is earlier than the acquisition time point A.

In embodiments of the present disclosure, based on the above situation, the acquisition time point corresponding to the calibration acquirer may be corrected to make the acquisition time point corresponding to the image acquirer keep consistent with the corrected acquisition time point corresponding to the calibration acquirer in the actual acquisition process. Specifically, the different acquisition time points corresponding to the calibration acquirer may be corrected according to the different acquisition time points of the image acquirer and a predetermined correction time variable, to obtain the different corrected image acquisition time points corresponding to the calibration acquirer. When correcting the acquisition time point corresponding to the calibration acquirer, a clock error range between the clock of the calibration acquirer and the clock of the image acquirer may be pre-estimated, the correction time variable is determined according to the clock error range, such that the acquisition time point corresponding to the calibration acquirer is corrected according to the correction time variable.

Exemplarily, taking two images acquired by the image acquirer as an example, when the image acquirer acquires the said two images, the image acquisition time points of the two images corresponding to the image acquirer is t1 and t2 respectively, the two image acquisition time points corresponding to the calibration acquirer is also t1 and t2 respectively. However, due to a clock error between the image acquirer and the calibration acquirer, two acquisition time points corresponding to the calibration acquirer are required to be corrected. Specifically, the two acquisition time points of t1 and t2 corresponding to the calibration acquirer may be corrected using a predetermined correction time variable dt to obtain t1+dt and t2+dt respectively. In the actual acquisition process, the t1+dt and t2+dt corrected may be consistent with the image acquisition time points of t1 and t2 of the two images corresponding to the image acquirer.

In embodiments of the present disclosure, when determining the correction time variable according to the clock error range, since it is not sure about the specific clock error between the clock of the calibration acquirer and the clock of the image acquirer, a rough range of clock error may be estimated. Thus, an accuracy may be determined within the range of clock error, and a plurality of correction time variables may be determined in the range of clock error according to the accuracy. Further, the different corrected image acquisition time points of the calibration acquirer are determined according to the different image acquisition time points of the image acquirer and the each predetermined correction time variable.

Exemplarily, assuming that the range of clock error estimated between the clock of the calibration acquirer and the clock of the image acquirer is −1 s~1 s, and the accuracy determined in the range of clock error is 10 ms, then the plurality of correction time variables dt determined within the range of clock error are −1 s, (−1 s+10 ms), (−1 s+20 ms), (−1 s+30 ms), (−1 s+40 ms), . . . (−1 s+1980 ms), (−1 s+1990 ms), 1 s. The two acquisition time points of t1 and t2 corresponding to the calibration acquirer may be corrected using the each predetermined correction time variable dt to obtain multiple sets of different corrected image acquisition points of t1+dt and t2+dt.

In embodiments of the present disclosure, the different corrected image acquisition time points corresponding to the each correction time variable may be determined according to the each correction time variable, and the second pose change of the calibration acquirer with respect to the reference coordinate system at the different corrected image acquisition time points corresponding to the each correction time variable is determined. The second pose change may refer to a change between poses of the calibration acquirer with respect to the reference coordinate system at the different corrected image acquisition time points. For example, taking the two images acquired by the image acquirer as an example, the two images may be defined as the first image and the second image, acquisition time points of the two images correspond to the first image acquisition time point and the second image acquisition time point respectively, two corrected image acquisition time points of the calibration acquirer may be obtained as a first corrected acquisition time point and a second corrected acquisition time point respectively according to the correction time variables and the first image acquisition time point and the second image acquisition time point, then the second pose change may be understood as the change between the pose of the calibration acquirer with respect to the reference coordinate system at the first corrected acquisition time point and the pose of the calibration acquirer with respect to the reference coordinate system at the second corrected acquisition time point.

It should be noted that, since the different image acquisition time points of the image acquirer include but are not limited to the first image acquisition time point corresponding to the first image and the second image acquisition time point corresponding to the second image, the different corrected image acquisition time points of the calibration acquirer include but are not limited to the first corrected acquisition time point and the second corrected acquisition time point above. Thus, the second pose change of the calibration acquirer with respect to the reference coordinate system at the different corrected image acquisition time points not only may include the pose change of the calibration acquirer with respect to the reference coordinate system at the first corrected acquisition time point and the second corrected time acquisition time point, but also include the pose change of the calibration acquirer with respect to the reference coordinate system at other different corrected image acquisition time points.

At block S103, a clock synchronization is performed on the image acquirer and the calibration acquirer according to the first pose change of the image acquirer and the second pose change of the calibration acquirer corresponding to each correction time variable.

In embodiments of the present disclosure, generally, on the basis of presetting a relative pose of the calibration acquirer and the image acquirer, when the clock of the image acquirer is synchronized with the clock of the calibration acquirer, a relative moving pose of the image acquirer is the same as the relative moving pose of the calibration acquirer during a same image acquisition time period, that is, the first pose change of the image acquirer with respect to the reference coordinate system at the different image acquisition time points is the same as the pose change of the calibration acquirer with respect to the reference coordinate system at the different image acquisition time points above. For example, taking the two images acquired by the image acquirer as an example, the first pose change of the image acquirer with respect to the reference coordinate system at the time points when acquiring the two images is determined as $\Delta R \Delta T$ through a 2D-2D camera pose estimation, and the image acquisition time points of the two images are t1 and t2; when the clock of the image acquirer is synchronized with the clock of the calibration acquirer, and the relative pose of the image acquirer and the calibration acquirer is fixed in advance, the second pose change of the calibration acquirer with respect to the reference coordinate system at the image acquisition time point t1 and the image acquisition time point t2 corresponding to the two images is also $\Delta R \Delta T$.

In embodiments of the present disclosure, when it is impossible to achieve the clock synchronization due to the clock error existing between the clock of the image acquirer and the clock of the calibration acquirer, the relative moving pose of the image acquirer is different from the relative moving pose of the calibration acquirer during the same image acquisition time period. Thus, at block S102, the clock error existing between the clock of the image acquirer and the clock of the calibration acquirer is corrected using the correction time variables, the different corrected image acquisition time points are determined according to the different image acquisition time points and the each predetermined correction time variable, to make the different corrected image acquisition time points of the calibration acquirer consistent with the different image acquisition time points of the image acquirer. Under the premise that the relative pose of the image acquirer and the calibration acquirer is fixed in advance, when the clock of the image acquirer has been synchronized with the clock of the calibration acquirer after correcting the clock error existing between the clock of the image acquirer and the clock of the calibration acquirer using the correction time variables, the first pose change of the image acquirer with respect to the reference coordinate system at the different image acquisition time points will be the same as the second pose change of the calibration acquirer with respect to the reference coordinate system at the different corrected image acquisition time points. On the basis of the above principle, the clock synchronization on the image acquirer and the calibration acquirer may be performed according to the first pose change of the image acquirer and the second pose change of the calibration acquirer corresponding to the each predetermined correction time variable.

Embodiments of the present disclosure provide the method for clock synchronization. The method includes: determining the first pose change of the image acquirer with respect to the reference coordinate system at the different image acquisition time points; determining the second pose change of the calibration acquirer with respect to the reference coordinate system at different corrected image acquisition time points, in which the different corrected image acquisition time points are determined according to the different image acquisition time points and the each predetermined correction time variable; and performing the clock synchronization on the image acquirer and the calibration acquirer according to the first pose change of the image acquirer and the second pose change of the calibration acquirer corresponding to the each correction time variable. The solution according to embodiments of the present disclosure solves a problem of a high cost and an internal wiring required due to using of externally triggered acquirers in the related art, and is able to use acquirers without external trigger to acquire information, realizing the clock synchronization of a plurality of acquirers without external trigger, and further realizing the synchronous acquisition of the plurality of acquirers without external trigger.

Embodiment 2

Figure 2:
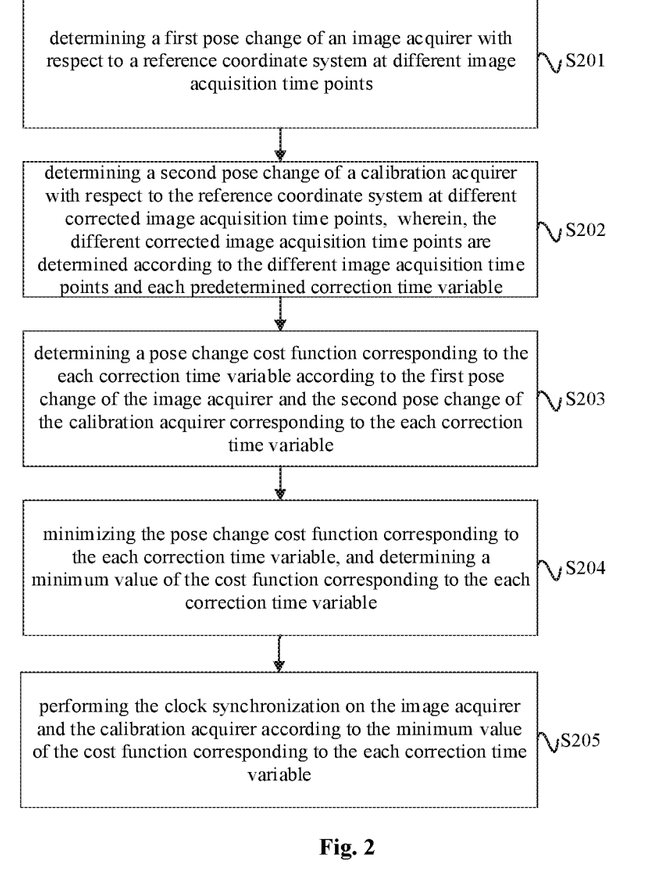
FIG. 2 is a flow chart of a method for clock synchronization according to Embodiment 2 of the present disclosure.

FIG. 2 is a flow chart of a method for clock synchronization according to Embodiment 2 of the present disclosure. The embodiment is a further variant improved on the basis of the embodiment described above, and this embodiment of the present disclosure may be combined with alternative solutions in one or more of the above embodiments.

As illustrated in FIG. 2, the method for clock synchronization provided in this embodiment may include the following.

At block S201, the first pose change of the image acquirer with respect to the reference coordinate system at the different image acquisition time points is determined.

In an alternative implementation of embodiments of the present disclosure, when a coordinate system of the calibration acquirer is determined as the reference coordinate system, determining the first pose change of the image acquirer with respect to the reference coordinate system at the different image acquisition time points may include the following.

At block S2011, a third pose change of the image acquirer with respect to a coordinate system of the image acquirer at the different image acquisition time points is determined.

At block S2012, the first pose change of the image acquirer with respect to the reference coordinate system at the different image acquisition time points is determined according to the third pose change and a relative pose between the image acquirer and the calibration acquirer.

In the implementation, when selecting the reference coordinate system, the coordinate system of the image acquirer may be determined as the reference coordinate system, and the coordinate system of the calibration acquirer may also be determined as the reference coordinate system, and of course, other suitable reference systems may also be used as the reference coordinate system. When the coordinate system of the calibration acquirer is determined as the reference coordinate system, the third pose change of the image acquirer with respect to the coordinate system of the image acquirer at the different image acquisition time points may be determined firstly, for the specific implementation of which, reference may be made to the operation in block S101, which will not be elaborated here. The relative pose of the image acquirer and the calibration acquirer is fixed in advance, the corresponding relative pose between the coordinate system of the image acquirer and the coordinate system of the calibration acquirer is also preset. According to the relative pose between the coordinate system of the image acquirer and the coordinate system of the calibration acquirer, a coordinate system conversion may be performed, the third pose change of the image acquirer with respect to the coordinate system of the image acquirer at the different image acquisition time points is converted to the coordinate system of the calibration acquirer, to obtain the first pose change of the image acquirer with respect to the coordinate system of the calibration acquirer at the different image acquisition time points.

Exemplarily, taking the two images acquired by the image acquirer as an example, the two images may be defined as the first image and the second image, the pose change of the image acquirer with respective to the coordinate system of the image acquirer at the time points when the image acquirer acquires the first image and the second image, which is referred as the third pose change, is determined according to the two images acquired by the image acquirer and using the 2D-2D camera pose estimation principle. The third pose change may be the change between the pose of the image acquirer with respective to the coordinate system of the image acquirer at the time point when acquiring the first image and the pose of the image acquirer with respective to the coordinate system of the image acquirer at the time point when acquiring the second image. It could be understood that, the different image acquisition time points in the implementation include but are not limited to the image acquisition time points corresponding to the first image and the second image. According to the relative pose between the coordinate system of the image acquirer and the coordinate system of the calibration acquirer, the coordinate system conversion may be performed, the pose change of the image acquirer with respect to the coordinate system of the image acquirer at the time points when acquiring the first image and the second image is converted to the coordinate system of the calibration acquirer, to obtain the pose change of the image acquirer with respect to the coordinate system of the calibration acquirer at the time points when the image acquirer acquires the first image and the second image, which is referred as the first pose change.

At block S202, the second pose change of the calibration acquirer with respect to the reference coordinate system at the different corrected image acquisition time points is determined, in which, the different corrected image acquisition time points are determined according to the different image acquisition time points and each predetermined correction time variable.

In an alternative implementation of embodiments of the present disclosure, when the coordinate system of the image acquirer is determined as the reference coordinate system, determining the second pose change of the calibration acquirer with respect to the reference coordinate system at the different corrected image acquisition time points may include the following.

At block S2021, a fourth pose change of the calibration acquirer with respect to the coordinate system of the calibration acquirer at the different corrected image acquisition time points is determined.

At block S2022, the second pose change of the calibration acquirer with respect to the reference coordinate system at the different corrected image acquisition time points is determined according to the fourth pose change and the relative pose of the image acquirer and the calibration acquirer.

In the implementation, when the coordinate system of the image acquirer is determined as the reference coordinate system, the fourth pose change of the calibration acquirer with respect to the coordinate system of the calibration acquirer at the different corrected image acquisition time points may be determined first. The relative pose of the image acquirer and the calibration acquirer is fixed in advance, correspondingly, the relative pose between the coordinate system of the image acquirer and the coordinate system of the calibration acquirer is also preset. According to the relative pose between the coordinate system of the image acquirer and the coordinate system of the calibration acquirer, the coordinate system conversion may be performed, the fourth pose change of the calibration acquirer with respect to the coordinate system of the calibration acquirer with respect to the coordinate system of the calibration acquirer at the different corrected image acquisition time points is converted to the coordinate system of the image acquirer, to obtain the second pose change of the calibration acquirer with respect to the coordinate system of the image acquirer at the different corrected image acquisition time points.

Exemplarily, taking two images acquired by the image acquirer as an example, the two images may be defined as the first image and the second image, the image acquisition time points of the first image and the second image are t1 and t2 respectively, the correction time variable is dt, and the different corrected image acquisition time points of the calibration acquirer are t1+dt and t2+dt. In this case, the fourth pose change of the calibration acquirer with respective to the coordinate system of the calibration acquirer at t1+dt and t2+dt may be determined, and the pose change of the calibration acquirer with respective to the coordinate system of the image acquirer at t1+dt and t2+dt, which is referred as the second pose change, may be obtained according to an external reference between the image acquirer and the calibration acquirer, such as the relative pose between the coordinate system of the image acquirer and the coordinate system of the calibration acquirer.

In a specific embodiment of the implementation, the calibration acquirer may be an inertial navigation device, a laser radar, a millimeter wave radar or other image acquirer. The following are illustrative descriptions with reference to the various types of calibration acquirers.

(1) When the calibration acquirer is an inertial navigation device, and the coordinate system of the image acquirer is determined as the reference coordinate system, determining the second pose change of the calibration acquirer with respect to the reference coordinate system at the different corrected image acquisition time points may specifically include: determining the different corrected image acquisition time points according to the different image acquisition time points and the each predetermined correction time variable; obtaining the poses of the inertial navigation device at the different corrected image acquisition time points; determining the fourth pose change of the inertial navigation device with respective to a coordinate system of the inertial navigation device at the different corrected image acquisition time points according to the obtained poses of the inertial navigation device at the different corrected image acquisition time points; and determining the second pose change of the inertial navigation device with respective to the reference coordinate system at the different corrected image acquisition time points according to the fourth pose change and the relative pose between the image acquirer and the inertial navigation device.

(2) When the calibration acquirer is a laser radar, and the coordinate system of the image acquirer is determined as the reference coordinate system, determining the second pose change of the calibration acquirer with respect to the reference coordinate system at the different corrected image acquisition time points may specifically include: determining the different corrected image acquisition time points according to the different image acquisition time points and the each predetermined correction time variable; when the laser radar is used as the calibration acquirer, calculating the pose of the laser radar using a SLAM technology, and obtaining a continuous motion trajectory of the laser radar at the different corrected image acquisition time points through an interpolation, and thus obtaining the fourth pose change of the laser radar with respect to the coordinate system of the laser radar at the different corrected image acquisition time points; and determining the second pose change of the laser radar with respective to the reference coordinate system at the different corrected image acquisition time points according to the fourth pose change and the relative pose between the image acquirer and the laser radar.

(3) When the calibration acquirer is a millimeter wave radar, and the coordinate system of the image acquirer is determined as the reference coordinate system, determining the second pose change of the calibration acquirer with respect to the reference coordinate system at the different corrected image acquisition time points may specifically include: determining the different corrected image acquisition time points according to the different image acquisition time points and the each predetermined correction time variable; when the millimeter wave radar is used as the calibration acquirer, calculating the pose of the millimeter wave radar using a SLAM technology, calculating a moving velocity of the millimeter wave radar itself by adopting the SLAM technology of the millimeter wave radar through a velocity distribution of surrounding obstacles, and calculating a motion trajectory of the millimeter wave radar by using a surrounding static millimeter wave radar target, and thus obtaining the fourth pose change of the millimeter wave radar with respective to the coordinate system of the millimeter wave radar at the different corrected image acquisition time points; and determining the second pose change of the millimeter wave radar with respective to the reference coordinate system at the different corrected image acquisition time points according to the fourth pose change and the relative pose between the image acquirer and the millimeter wave radar.

(4) When the calibration acquirer is the other image acquirer, and the coordinate system of the image acquirer is determined as the reference coordinate system, determining the second pose change of the calibration acquirer with respect to the reference coordinate system at the different corrected image acquisition time points may specifically include: performing interpolation on the pose pf the other image acquirer, obtaining a continuous motion trajectory of the other image acquirer, and thus determining the second pose change of the other image acquirer with respective to the reference coordinate system at the different corrected image acquisition time points; and further, determining the second pose change of the other image acquirer with respective to the reference coordinate system at the different corrected image acquisition time points according to the fourth pose change and the relative pose between the image acquirer and the other image acquirer.

At block S203, a pose change cost function corresponding to the each correction time variable is determined according to the first pose change of the image acquirer and the second pose change of the calibration acquirer corresponding to the each correction time variable.

In embodiments of the present disclosure, acts at block S203-S205 is a further optimization of the act at block S103 in Embodiment 1. Alternatively, according to the first pose change of the image acquirer and the second pose change of the calibration acquirer corresponding to the each correction time variable, the constructed pose change cost function corresponding to the each correction time variable specifically may be: $F=\Sigma\|\log(\Delta R^{-1}\Delta R')\|+\|\Delta T \times \Delta T'\|$;

where F represents the pose change cost function, $(\Delta R, \Delta T)$ represents the first pose change of the image acquirer with respect to the reference coordinate system at the different image acquisition time points of $t1$, $t2$, $(\Delta R',\Delta T')$ represents the second pose change of the calibration acquirer with respect to the reference coordinate system at the different corrected image acquisition time points of $t1+dt$, $t2+dt$, $dt$ represents the correction time variable, $\Sigma$ represents a summation operator, and $\times$ represents a cross product operator.

It should be noted that, the image acquisition time point $t1$ and the image acquisition time point $t2$ in the embodiment are only used to distinguish the different image acquisition time points. When it is necessary to determine the first pose change of the image acquirer with respect to the reference coordinate system at other different image acquisition time points, $t1$ and $t2$ may be set as the other image acquisition time points. Thus, a set of the first pose change of the image acquirer with respect to the reference coordinate system at the different image acquisition time points may be obtained. The corrected acquisition time point of $t1+dt$ and the corrected acquisition time point of $t2+dt$ are only used to distinguish the different corrected image acquisition time points, in which $t1+dt$ and $t2+dt$ correspond to the different image acquisition time points $t1$ and $t2$ of the image acquirer respectively. When it is necessary to determine the second pose change of the calibration acquirer with respect to the reference coordinate system at the different corrected image acquisition time points, the second pose change of the calibration acquirer with respect to the reference coordinate system at the different corrected image acquisition time points corresponding to the each correction time variable may be determined.

At block S204, the pose change cost function corresponding to the each correction time variable is minimized, and a minimum value of the pose change cost function corresponding to the each correction time variable is determined.

At block S205, the clock synchronization is performed on the image acquirer and the calibration acquirer according to the minimum value of the pose change cost function corresponding to the each correction time variable.

In embodiments of the present disclosure, the pose change cost function corresponding to the each correction time variable is minimized to obtain the minimum value (ΔR'-ΔR, ΔT'-ΔT) of the cost function corresponding to the each correction time variable. After obtaining the minimum value of the cost function corresponding to the each correction time variable, a minimal value is selected from the minimum values of the cost functions corresponding to respective correction time variables, and the correction time variable corresponding to the minimal value selected is determined as a time difference between the image acquirer and the calibration acquirer. The clock synchronization is performed on the image acquirer and the calibration acquirer according to the determined time difference between the image acquirer and the calibration acquirer.

Embodiments of the present disclosure provide a method for clock synchronization. The method includes: determining the first pose change of the image acquirer with respect to the reference coordinate system at the different image acquisition time points; determining the second pose change of the calibration acquirer with respect to the reference coordinate system at the different corrected image acquisition time points, in which, the different corrected image acquisition time points are determined according to the different image acquisition time points and the each predetermined correction time variable; determining the pose change cost function corresponding to the each correction time variable according to the first pose change of the image acquirer and the second pose change of the calibration acquirer corresponding to each correction time variable; minimizing the pose change cost function corresponding to the each correction time variable, and determining the minimum value of the cost function corresponding to the each correction time variable; and performing the clock synchronization on the image acquirer and the calibration acquirer according to the minimum value of the cost function corresponding to the each correction time variable. The solution according to embodiments of the present disclosure solves the problem of the high cost and the internal wiring required due to the using of the externally triggered acquirers in the related art, and is able to use acquirers without external trigger to acquire information, realizing the clock synchronization of the plurality of acquirers without external trigger, reducing the cost of using the externally triggered acquirers, omitting an externally triggered circuit and other modules, and improving an adaptability of automatic driving.

Embodiment 3

Figure 3:
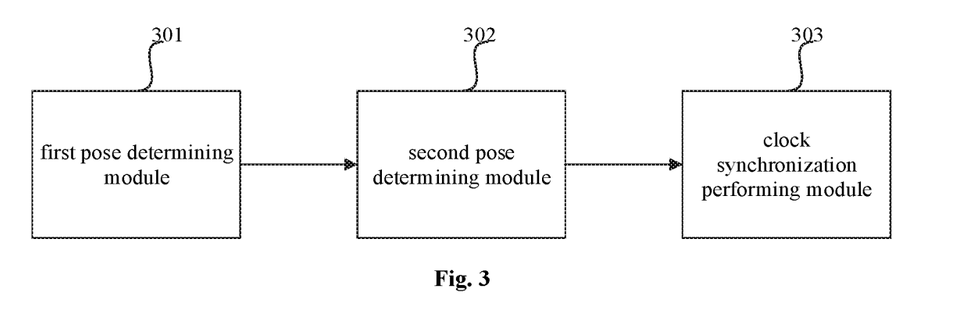
FIG. 3 is a block diagram of an apparatus for clock synchronization according to Embodiment 3 of the present disclosure.

FIG. 3 is a block diagram of an apparatus for clock synchronization according to Embodiment 3 of the present disclosure. The embodiment may be applied to realize the synchronous acquisition of the plurality of acquirers, for example, to realize synchronous exposure and acquisition of a plurality of cameras in an automatic driving system. The apparatus may be implemented in software and/or hardware and may be integrated on any device with network communication function.

As illustrated in FIG. 3, the apparatus for clock synchronization in this embodiment of the present disclosure may include a first pose determining module 301, a second pose determining module 302, and a clock synchronization performing module 303.

The first pose determining module 301 is configured to determine a first pose change of an image acquirer with respect to a reference coordinate system at different image acquisition time points.

The second pose determining module 302 is configured to determine a second pose change of a calibration acquirer with respect to the reference coordinate system at different corrected image acquisition time points, in which the different corrected image acquisition time points are determined according to the different image acquisition time points and each predetermined correction time variable.

The clock synchronization performing module 303 is configured to perform a clock synchronization on the image acquirer and the calibration acquirer according to the first pose change of the image acquirer and the second pose change of the calibration acquirer corresponding to each correction time variable.

In an alternative implementation of embodiments of the present disclosure, the clock synchronization performing module 303 may include a cost function determining unit, a minimizing unit, and a clock synchronization performing unit.

The cost function determining unit is configured to determine a pose change cost function corresponding to the each correction time variable according to the first pose change of the image acquirer and the second pose change of the calibration acquirer corresponding to the each correction time variable.

The minimizing unit is configured to minimize the pose change cost function corresponding to the each correction time variable, and determine a minimum value of the pose change cost function corresponding to the each correction time variable.

The clock synchronization performing unit is configured to perform the clock synchronization on the image acquirer and the calibration acquirer according to the minimum value of the cost function corresponding to the each correction time variable.

In an alternative implementation of embodiments of the present disclosure, the cost function determining unit is specifically configured to construct the pose change cost function corresponding to the each correction time variable according to a formula of:

$$F = \Sigma \|\log(\Delta R^{-1} \Delta R')\| + \|\Delta T \times \Delta T'\|;$$

where F represents the pose change cost function, (ΔR, ΔT) represents the first pose change of the image acquirer with respect to the reference coordinate system at the different image acquisition time points of t1, t2, (ΔR',ΔT') represents the second pose change of the calibration acquirer with respect to the reference coordinate system at the different corrected image acquisition time points of t1+dt, t2+dt, dt represents the correction time variable, Σ represents a summation operator, and × represents a cross product operator.

In an alternative implementation of embodiments of the present disclosure, the clock synchronization performing unit may include a minimal value selecting subunit and a clock synchronization performing subunit.

The minimal value selecting subunit is configured to select a minimal value from the minimum values of the cost functions corresponding to respective correction time variables.

The clock synchronization performing subunit is configured to determine the correction time variable corresponding to the minimal value selected as a time difference between the image acquirer and the calibration acquirer.

In an alternative implementation of embodiments of the present disclosure, when the coordinate system of the calibration acquirer is determined as the reference coordinate system, the first pose determining module 301 may include a third pose determining unit and a first pose determining unit.

The third pose determining unit is configured to determine a third pose change of the image acquirer with respect to a coordinate system of the image acquirer at the different image acquisition time points.

The first pose determining unit is configured to determine the first pose change of the image acquirer with respect to the reference coordinate system at the different image acquisition time points according to the third pose change and a relative pose between the image acquirer and the calibration acquirer.

The apparatus for clock synchronization provided by embodiments of the present disclosure may execute the method for clock synchronization provided by any of embodiments of the present disclosure, and have function modules and beneficial effects corresponding to executing the method.

Embodiment 4

Figure 4:
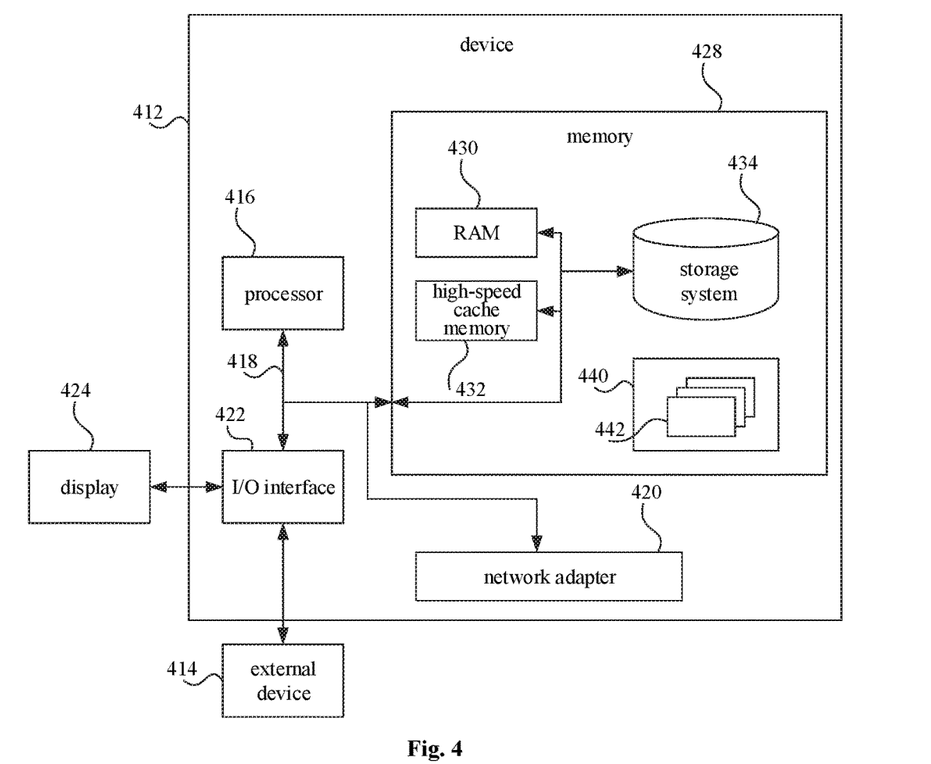
FIG. 4 is a block diagram of a device according to Embodiment 4 of the present disclosure.

FIG. 4 is a block diagram of a device according to Embodiment 4 of the present disclosure. FIG. 4 is a block diagram of a device 412 for implementing embodiments of the present disclosure. The device 412 illustrated in FIG. 4 is only illustrated as an example, and should not be considered as any restriction on the function and the usage scope of embodiments of the present disclosure.

As illustrated in FIG. 4, the device 412 is in the form of a general-purpose computing apparatus. The device 412 may include, but is not limited to, one or more processors or processing units 416, a memory 428, and a bus 418 connecting different system components (including the memory 428 and the processor 416).

The bus 418 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the device 412 may include multiple kinds of computer-readable media. These media may be any storage media accessible by the device 412, including transitory or non-transitory storage medium and movable or unmovable storage medium.

The memory 428 may include a computer-readable medium in a form of volatile memory, such as a random access memory (RAM) 430 and/or a high-speed cache memory 432. The device 412 may further include other transitory/non-transitory storage media and movable/unmovable storage media. In way of example only, the storage system 434 may be used to read from and write into non-removable, non-volatile magnetic media (not shown in the figure, commonly referred to as "hard disk drives"). Although not illustrated in FIG. 4, a disk driver for reading from and writing into movable non-volatile magnetic disks (e.g. "floppy disks"), as well as an optical driver for reading from and writing into movable non-volatile optical disks (e.g. a compact disc read only memory (CD-ROM, a digital video disc read only Memory (DVD-ROM), or other optical media) may be provided. In these cases, each driver may be connected to the bus 418 via one or more data medium interfaces. The memory 428 may include at least one program product, which has a set of (for example at least one) program modules configured to perform the functions of embodiments of the present disclosure.

A program/application 440 with a set of (at least one) program modules 442 may be stored in memory 428, the program modules 442 may include, but not limit to, an operating system, one or more application programs, other program modules and program data, and any one or combination of above examples may include an implementation in a network environment. The program modules 442 are generally configured to implement functions and/or methods described in embodiments of the present disclosure.

The device 412 may also communicate with one or more external devices 414 (e.g., a keyboard, a pointing device, a display 424, and etc.) and may also communicate with one or more devices that enables a user to interact with the computer system/server 412, and/or any device (e.g., a network card, a modem, and etc.) that enables the computer system/server 412 to communicate with one or more other computing devices. This kind of communication can be achieved by the input/output (I/O) interface 422. In addition, the device 412 may be connected to and communicate with one or more networks such as a local area network (LAN), a wide area network (WAN) and/or a public network such as the Internet through a network adapter 420. As shown in FIG. 4, the network adapter 420 communicates with other modules of the device 412 over bus 418. It should be understood that although not shown in the figure, other hardware and/or software modules may be used in combination with the device 412, which including, but not limited to, microcode, device drivers, redundant processing units, external disk drive arrays, Redundant Arrays of Independent Disks (RAID) systems, tape drives, as well as data backup storage systems and the like.

The processor 416 may perform various functional applications and data processing by running programs stored in the memory 428, for example, to perform the method for clock synchronization provided by embodiments of the present disclosure. The method may include: determining the first pose change of the image acquirer with respect to the reference coordinate system at the different image acquisition time points; determining the second pose change of the calibration acquirer with respect to the reference coordinate system at the different corrected image acquisition time points, in which, the different corrected image acquisition time points are determined according to the different image acquisition time points and the each predetermined correction time variable; and performing the clock synchronization on the image acquirer and the calibration acquirer according to the first pose change of the image acquirer and the second pose change of the calibration acquirer corresponding to the each correction time variable.

Embodiment 5

Embodiment 5 of the present disclosure provides a computer readable storage medium, stored thereon with computer programs that, when executed by a processor, configured to perform the method for clock synchronization according to embodiments of the present disclosure. The method may include: determining the first pose change of the image acquirer with respect to the reference coordinate system at the different image acquisition time points; determining the second pose change of the calibration acquirer with respect to the reference coordinate system at the different corrected image acquisition time points, in which, the different corrected image acquisition time points are determined according to the different image acquisition time points and the each predetermined correction time variable; and performing the clock synchronization on the image acquirer and the calibration acquirer according to the first pose change of the image acquirer and the second pose change of the calibration acquirer corresponding to the each correction time variable.

The above storage medium including the computer executable instructions may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

Figure 5:
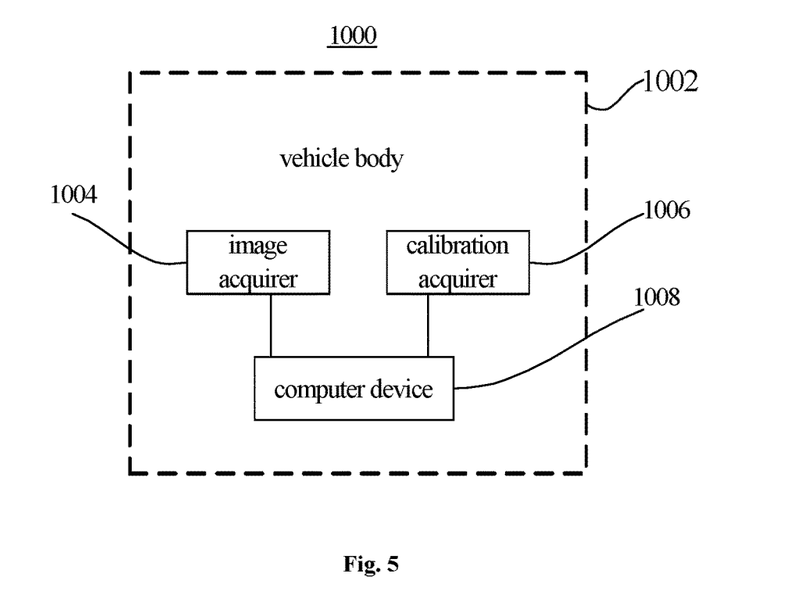
FIG. 5 is a block diagram of a vehicle according to embodiments of the present disclosure.

Further, embodiments of the present disclosure further provide a vehicle. FIG. 5 is a block diagram of a vehicle according to embodiments of the present disclosure. As illustrated in FIG. 5, The vehicle 1000 includes a vehicle body 1002, an image acquirer 1004, a calibration acquirer 1006 and a computer device 1008. The image acquirer 1004 and the calibration acquirer 1006 are provided on the vehicle body. The computer device 1008 is in a communication connection with the image acquirer 1004 and the calibration acquirer 1006 respectively, and is configured to perform the clock synchronization on the image acquirer 1004 and the calibration acquirer 1006. In detail, the computer device 1008 may perform the clock synchronization on the image acquirer 1004 and the calibration acquirer 1006 as described in Embodiment 1 and Embodiment 2.

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for clock synchronization, comprising:
determining a first pose change of an image acquirer with respect to a reference coordinate system at different image acquisition time points;
determining a second pose change of a calibration acquirer with respect to the reference coordinate system at different corrected image acquisition time points, wherein, the different corrected image acquisition time points are determined according to the different image acquisition time points and each predetermined correction time variable; and
performing a clock synchronization on the image acquirer and the calibration acquirer according to the first pose change of the image acquirer and the second pose change of the calibration acquirer corresponding to each correction time variable,
wherein performing the clock synchronization for the image acquirer and the calibration acquirer according to the first pose change of the image acquirer and the second pose change of the calibration acquirer corresponding to each correction time variable comprises:
determining a pose change cost function corresponding to the each correction time variable according to the first pose change of the image acquirer and the second pose change of the calibration acquirer corresponding to the each correction time variable;
minimizing the pose change cost function corresponding to the each correction time variable, and determining a minimum value of the pose change cost function corresponding to the each correction time variable; and
performing the clock synchronization on the image acquirer and the calibration acquirer according to the minimum value of the pose change cost function corresponding to the each correction time variable.

2. The method of claim 1, wherein determining the pose change cost function corresponding to the each correction time variable according to the first pose change of the image acquirer and the second pose change of the calibration acquirer corresponding to the each correction time variable comprises:

constructing the pose change cost function corresponding to the each correction time variable according to a formula of:

$$F=\Sigma \|\log(\Delta R^{-1}\Delta R')\|+\|\Delta T \times \Delta T'\|;$$

wherein, F represents the pose change cost function, ($\Delta R$, $\Delta T$) represents the first pose change of the image acquirer with respect to the reference coordinate system at the different image acquisition time points of t1, t2, ($\Delta R', \Delta T'$) represents the second pose change of the calibration acquirer with respect to the reference coordinate system at the different corrected image acquisition time points of t1+dt, t2+dt, dt represents the correction time variable, $\Sigma$ represents a summation operator, and × represents a cross product operator.

3. The method of claim 1, wherein performing the clock synchronization on the image acquirer and the calibration acquirer according to the minimum value of the pose change cost function corresponding to the each correction time variable comprises:

selecting a minimal value from the minimum values of the pose change cost functions corresponding to respective correction time variables; and determining the correction time variable corresponding to the minimal value selected as a time difference between the image acquirer and the calibration acquirer.

4. The method of claim 1, wherein in response to the coordinate system of the calibration acquirer being determined as the reference coordinate system, determining the first pose change of the image acquirer with respect to the reference coordinate system at the different image acquisition time points comprises:

determining a third pose change of the image acquirer with respect to a coordinate system of the image acquirer at the different image acquisition time points; and determining the first pose change of the image acquirer with respect to the reference coordinate system at the different image acquisition time points according to the third pose change and a relative pose between the image acquirer and the calibration acquirer.

5. An apparatus for clock synchronization, comprising:
a processor; and
a memory, configured to store software modules executable by the processor,
wherein the processor is configured to perform a method for clock synchronization by reading the software modules stored in the memory, the method comprising:

determining a first pose change of an image acquirer with respect to a reference coordinate system at different image acquisition time points;

determining a second pose change of a calibration acquirer with respect to the reference coordinate system at different corrected image acquisition time points, wherein, the different corrected image acquisition time points are determined according to the different image acquisition time points and each predetermined correction time variable; and performing a clock synchronization on the image acquirer and the calibration acquirer according to the first pose change of the image acquirer and the second pose change of the calibration acquirer corresponding to each correction time variable, wherein performing the clock synchronization for the image acquirer and the calibration acquirer according to the first pose change of the image acquirer and the second pose change of the calibration acquirer corresponding to each correction time variable comprises:

determining a pose change cost function corresponding to the each correction time variable according to the first pose change of the image acquirer and the second pose change of the calibration acquirer corresponding to the each correction time variable;

minimizing the pose change cost function corresponding to the each correction time variable, and determining a minimum value of the post change cost function corresponding to the each correction time variable; and performing the clock synchronization on the image acquirer and the calibration acquirer according to the minimum value of the pose change cost function corresponding to the each correction time variable.

6. The apparatus of claim 5, wherein determining the pose change cost function corresponding to the each correction time variable according to the first pose change of the image acquirer and the second pose change of the calibration acquirer corresponding to the each correction time variable comprises:

constructing the pose change cost function corresponding to the each correction time variable according to a formula of:

$$F=\Sigma \|\log(\Delta R^{-1}\Delta R')\|+\|\Delta T \times \Delta T'\|;$$

wherein, F represents the pose change cost function, ($\Delta R, \Delta T$) represents the first pose change of the image acquirer with respect to the reference coordinate system at the different image acquisition time points of t1, t2, ($\Delta R', \Delta T'$) represents the second pose change of the calibration acquirer with respect to the reference coordinate system at the different corrected image acquisition time points of t1+dt, t2+dt, dt represents the correction time variable, $\Sigma$ represents a summation operator, and × represents a cross product operator.

7. The apparatus of claim 5, wherein performing the clock synchronization on the image acquirer and the calibration acquirer according to the minimum value of the pose change cost function corresponding to the each correction time variable comprises:

selecting a minimal value from the minimum values of the pose change cost functions corresponding to respective correction time variables; and determining the correction time variable corresponding to the minimal value selected as a time difference between the image acquirer and the calibration acquirer.

8. The apparatus of claim 5, wherein in response to a coordinate system of the calibration acquirer being determined as the reference coordinate system, determining the first pose change of the image acquirer with respect to the reference coordinate system at the different image acquisition time points comprises:

determining a third pose change of the image acquirer with respect to a coordinate system of the image acquirer at the different image acquisition time points; and determining the first pose change of the image acquirer with respect to the reference coordinate system at the different image acquisition time points according to the third pose change and a relative pose between the image acquirer and the calibration acquirer.

9. A vehicle, comprising:
a vehicle body,
an image acquirer, provided on the vehicle body;
a calibration acquirer, provided on the vehicle body; and
a computer device, in a communication connection with the image acquirer and the calibration acquirer respectively, and configured to:
determine a first pose change of the image acquirer with respect to a reference coordinate system at different image acquisition time points;
determine a second pose change of the calibration acquirer with respect to the reference coordinate system at different corrected image acquisition time points, wherein, the different corrected image acquisition time points are determined according to the different image acquisition time points and each predetermined correction time variable; and
performing a clock synchronization on the image acquirer and the calibration acquirer according to the first pose change of the image acquirer and the second pose change of the calibration acquirer corresponding to each correction time variable,
wherein the computer device is configured to:
determine a pose change cost function corresponding to the each correction time variable according to the first pose change of the image acquirer and the second pose change of the calibration acquirer corresponding to the each correction time variable;
minimize the pose change cost function corresponding to the each correction time variable, and determining a minimum value of the pose change cost function corresponding to the each correction time variable; and
perform the clock synchronization on the image acquirer and the calibration acquirer according to the minimum value of the pose change cost function corresponding to the each correction time variable.

10. The vehicle of claim 9, wherein the computer device is configured to:
construct the pose change cost function corresponding to the each correction time variable according to a formula of:

$$F=\Sigma \|\log(\Delta R^{-1}\Delta R')\|+\|\Delta T \times \Delta T'\|;$$

wherein, F represents the pose change cost function, ($\Delta R, \Delta T$) represents the first pose change of the image acquirer with respect to the reference coordinate system at the different image acquisition time points of t1, t2, ($\Delta R', \Delta T'$) represents the second pose change of the calibration acquirer with respect to the reference coordinate system at the different corrected image acquisition time points of t1+dt, t2+dt, dt represents the correction time variable, $\Sigma$ represents a summation operator, and × represents a cross product operator.

11. The vehicle of claim 9, wherein the computer device is configured to:
select a minimal value from the minimum values of the pose change cost functions corresponding to respective correction time variables; and
determine the correction time variable corresponding to the minimal value selected as a time difference between the image acquirer and the calibration acquirer.

12. The vehicle of claim 9, wherein in response to the coordinate system of the calibration acquirer being determined as the reference coordinate system, the computer device is configured to:
determine a third pose change of the image acquirer with respect to a coordinate system of the image acquirer at the different image acquisition time points; and
determine the first pose change of the image acquirer with respect to the reference coordinate system at the different image acquisition time points according to the third pose change and a relative pose between the image acquirer and the calibration acquirer.

13. The vehicle of claim 9, wherein the calibration acquirer is an inertial navigation device, a laser radar, a millimeter wave radar or other image acquirer.

* * * * *